Sept. 17, 1940.  E. S. COOK ET AL  2,215,347
QUICK RELEASE MEANS FOR BRAKE SYSTEMS
Filed Dec. 31, 1938
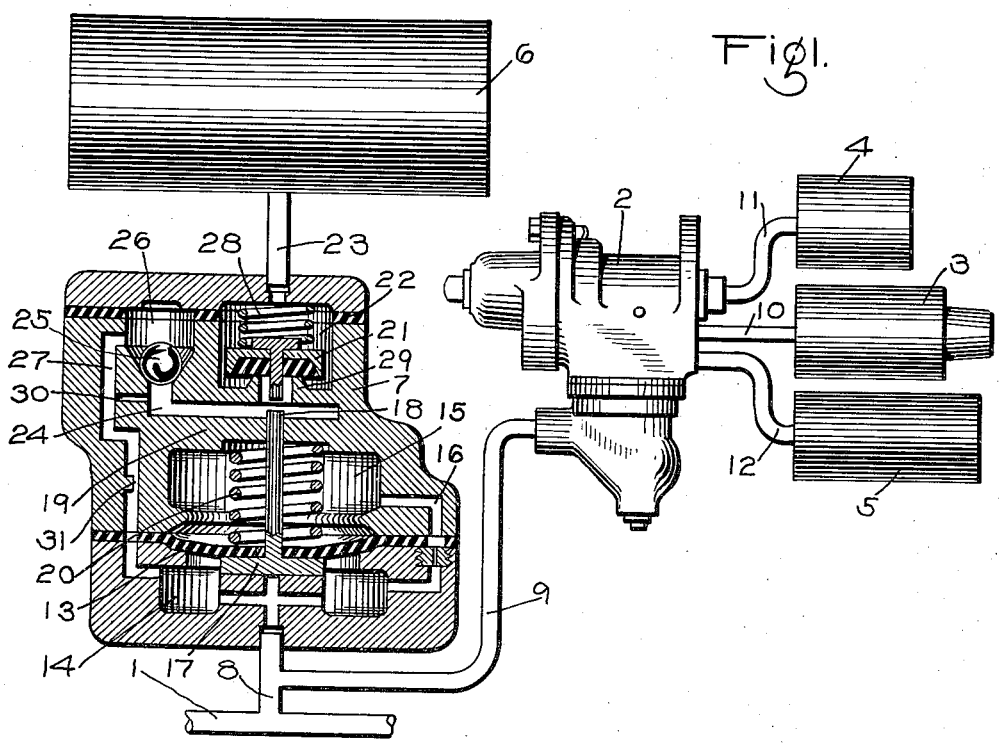
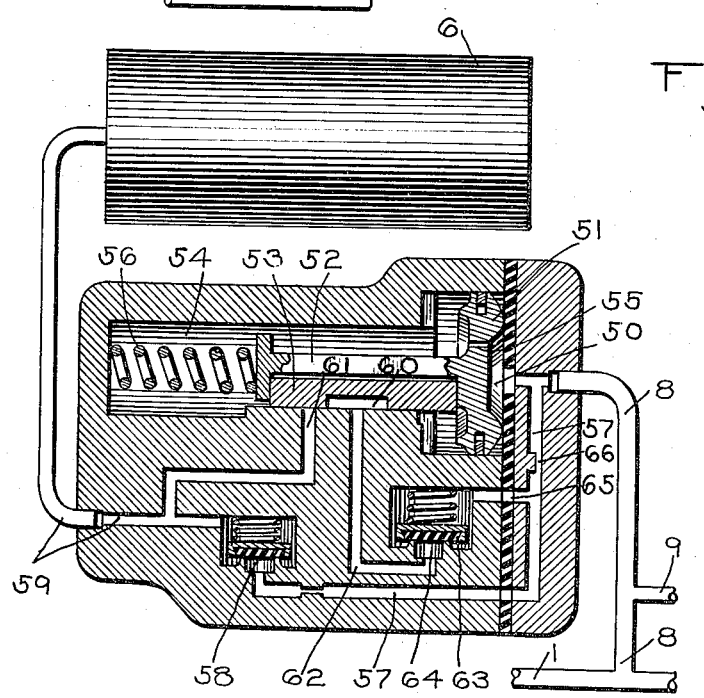
INVENTORS
EARLE S. COOK
JOHN CANETTA
BY
ATTORNEY Patented Sept. 17, 1940

2,215,347

UNITED STATES PATENT OFFICE 2,215,347

QUICK RELEASE MEANS FOR BRAKE SYSTEMS

Earle S. Cook and John Canetta, Wilkinsburg, Pa., assignors to The Westinghouse Air Brake Company, Wilmerding, Pa., a corporation of Pennsylvania Application December 31, 1938, Serial No. 248,666

4 Claims. (Cl. 303—66)

This invention relates to fluid pressure brake equipment and more particularly to fluid pressure brake equipments of the graduated release type which, following an application of the brakes, are adapted to respond to steps or increments of increase in brake pipe pressure to graduate the release of the brakes, and has for its principal object the provision of a graduated release fluid pressure brake equipment having novel means for promptly propagating release graduations serially throughout the length of a train of cars equipped with the invention.

Another object of the invention is to provide a graduated release fluid pressure brake equipment having means operable upon each increase in brake pipe pressure in graduating the release of the brakes to supply fluid under pressure from a normally charged source, such as a reservoir, to the brake pipe to accelerate the rate of recharge of the brake pipe on a train of cars each equipped with the invention and to thereby propagate a quick serial transmission of release graduations of the brakes throughout the length of the train.

A further object of the invention is to provide a fluid pressure brake equipment of the graduated release type having means operative upon each step or increment of increase in brake pipe pressure as controlled by the enginemen's brake valve device in graduating the release of the brakes to supply additional fluid under pressure from a normally charged source to the brake pipe in amounts dependent upon the degree of increase in brake pipe pressure as controlled by the operation of the brake valve device to increase the rate of recharge of the brake pipe and to thereby serially propagate release graduations of the brakes on a train of cars equipped with the invention.

Other objects and advantages will appear in the following more detailed description of the invention.

In the accompanying drawing Fig. 1 is a diagrammatic view, partly in section, of a fluid pressure brake equipment embodying the invention; and Fig. 2 is a fragmentary diagrammatic view, mostly in section, of the equipment and showing a modified form of the invention.

As shown in Fig. 1 the equipment may comprise a brake pipe 1, a brake controlling valve device 2, a brake cylinder 3, an auxiliary reservoir 4, a supplemental reservoir 5, a supply reservoir 6 and a recharging control valve device 7.

The brake controlling valve device 2 shown in the drawing is in the form of a triple valve device of the graduated release type having associated therewith in the usual manner the brake pipe 1, auxiliary reservoir 4, supplemental reservoir 5 and brake cylinder 3. The details of this type of brake controlling valve device is so well known by those skilled in the fluid pressure brake art that it has been deemed unnecessary to show it in other than diagrammatic form. It should however be mentioned that the piston chamber of the brake controlling valve device is in constant open communication wtih the brake pipe by way of connected branch pipes 8 and 9 and that the brake cylinder, auxiliary reservoir and supplemental reservoirs are connected in the usual manner to the brake controlling valve device 2 by way of pipes 10, 11 and 12, respectively.

The recharging control valve device 7 is for the purpose of admitting fluid under pressure from the supply reesrvoir 6 to the brake pipe 1 in releasing the brakes so as to propagate a quick releasing action of the brakes throughout the length of the train, and for the purpose of controlling the amount of fluid thus admitted to the brake pipe according to the amount of increase in brake pipe pressure.

This valve device may comprise a hollow casing in the interior of which there is suitably mounted a flexible diaphragm 13 having at one side a chamber 14 which is in constant open communication through branch pipe 8 with the brake pipe 1, and having at the other side a small volume chamber 15 which is connected through a choked passage 16 to the chamber 14.

Secured to the diaphragm 13 so as to be operative thereby is a follower 17 having a stem 18 which extends across the chamber 15 and through an opening in wall 19 of the chamber, the stem, where it passes through the opening, having at all times a lap or any other suitable air tight fit with the wall.

Contained in chamber 15 and interposed between and operatively engaging the diaphragm 13 is a light spring 20 which is of such value as to maintain the diaphragm in its inner flexed position as shown in Fig. 1 when the fluid pressure acting on opposite sides of the diaphragm are substantially equal.

Beyond the wall 19 the end of the follower stem 18 is adapted to engage a supply valve 21 which is contained in a chamber 22 constantly connected to the supply reservoir 6 through a pipe 23. This valve is operative by the follower stem to control communication between the chamber 22 and a passage 24 which lead to the underside of a ball check valve 25 contained in a chamber 26 which is connected to a passage 27 leading to the chamber 14, which latter passage is provided with a choke 31. Also contained in chamber 22 and interposed between and operatively engaging the valve and the casing is a spring 28 which, with the diaphragm in its inner flexed position as shown in Fig. 1, acts to maintain the valve seated on an annular seat rib 29 carried by the casing.

The passages 24 and 27 are also connected through a flow restricting passage 30.

Initial charging

In initially charging the equipment, fluid under pressure supplied to the brake pipe flows through branch pipe 8 to the diaphragm chamber 14, passage 27, and flow restricting passage 30 to passage 24. When the pressure of fluid in chamber 14 and acting on diaphragm 13 is sufficient to overcome the combined pressures of the springs 20 and 28 (about two pounds) the diaphragm will be caused to flex outwardly actuating the follower stem to unseat the supply valve. With the valve unseated fluid under pressure flows from passage 24 past the unseated valve, through valve chamber 22 and pipe 23 to the supply reservoir 6.

When, in thus charging the equipment, the pressure of fluid in chamber 15 together with the combined pressures of the springs 20 and 28 slightly exceeds brake pipe pressure in chamber 14, this greater pressure will cause the diaphragm 13 to flex inwardly to its normal position as shown in Fig. 1. When this occurs fluid under pressure will continue to flow from the brake pipe past the supply valve to the supply reservoir until such time as the reservoir is charged to substantially brake pipe pressure, that is to say, until the reservoir pressure is within about one half pound or the value of spring 28 below brake pipe pressure, at which time the valve seats on the seat rib 29 and maintains the supply reservoir pressure for use in succeeding release operation which will be hereinafter described.

From the branch pipe 8 fluid under pressure flows through pipe 9 to the piston chamber of the brake controlling valve device and from thence flows in the usual manner to both the auxiliary reservoir 4 and the supplemental reservoir 5.

Thus the equipment is fully charged with fluid under pressure.

Application of the brakes

To effect an application of the brakes, fluid under pressure is vented from the brake pipe in the usual manner by the use of the engineman's brake valve device. In response to the resulting reduction in brake pipe pressure, the brake controlling valve device functions in the usual manner to supply fluid under pressure from the auxiliary reservoir 4 to the brake cylinder 5.

It will here be noted that when the brake pipe pressure is thus reduced there can be no back flow of fluid from the supply reservoir 6 to the brake pipe since the supply valve 21 is maintained seated by the spring 28. From this it will be seen that when an application of the brakes is being effected the supply reservoir will remain fully charged.

As the pressure of fluid in chamber 14 reduces, fluid under pressure flows from the chamber 15 to chamber 14 by way of the choked passage 16 so that when the desired reduction in brake pipe pressure has been effected the pressure of fluid in chamber 14 will equalize into the chamber 14 and brake pipe 1, thus rendering the diaphragm 13 more sensitive to a subsequent increase in brake pipe pressure in releasing the brakes than would otherwise be the case.

Graduated release of the brakes

When it is desired to effect a graduated release of the brakes, that is to say, to effect a release of the brakes in several successive steps or increments the brake pipe pressure is increased in steps or increments through the medium of the engineman's brake valve device.

To initiate each release graduation the engineman operates the brake valve device to either release or running position and then to lap position, the brake valve device being maintained in running or release position long enough to produce the desired degree of release.

With the brake valve device in either running or release position the increase in brake pipe pressure on the cars at the front end of the train will be at the usual rapid rate. Now when the brake valve device is operated to lap position the pressure built up in the brake pipe on these cars will tend to equalize toward the rear end of the train and into the auxiliary reservoir by way of the usual feed grooves in the triple valve device.

Now when the brake pipe pressure and consequently the pressure of fluid in chamber 14 is increased in effecting a release graduation the choked passage 16 so restricts the flow of fluid from the chamber 14 to the chamber 15 that there is built up on the diaphragm 13 a fluid pressure differential of sufficient magnitude to cause the diaphragm to flex outwardly from the position in which it is shown in Fig. 1, thereby unseating the supply valve 21.

Fluid under pressure now flows from the fully charged supply reservoir 6 to the brake pipe 1 by way of pipe 23, supply valve chamber 22, past the unseated supply valve, through passage 24, past the ball check valve 25, through ball check valve chamber 26, choked passage 27, chamber 14 and branch pipe 8.

From the foregoing it will be apparent that the brake pipe is now being supplied with fluid under pressure from two sources instead of the usual single source, that is to say from the main reservoir, not shown, by way of the brake valve device and also from the supply reservoir 6 by way of the supply control valve device 7 instead of from the main reservoir only. Obviously this dual supply will increase brake pipe pressure at a much faster rate than where the supply of fluid comes from a single source.

This rapid increase in brake pipe pressure on one car will be effective on the following car and will cause the supply control valve device 7 on this following car to function to supply fluid under pressure from the local supply reservoir 6 to the brake pipe 1 in the same manner as the corresponding valve device 7 on the car ahead. In this way a rapid rate of increase in brake pipe pressure is rapidly propagated from car to car throughout the length of the train.

Now when the brake valve device is operated to lap position it cuts off the supply of fluid under pressure from the main reservoir to the brake pipe whereupon the brake pipe pressure on the cars at the head end of the train will drop rapidly due to the flow of fluid from these cars to the cars toward the rear of the train and the flow of fluid from the brake pipe to the auxiliary reservoir, the flow of fluid from the supply reservoir 6 being insufficient to maintain brake pipe pressure at its temporary higher pressure.

When the brake pipe pressure in chamber 14 thus drops to a pressure below that of the combined opposing pressures of fluid in chamber 15 and the springs 20 and 28 these combined pressures cause the diaphragm 13 to flex inwardly to its normal position as shown in Fig. 1, thereby moving the follower stem out of supporting relationship with the supply valve 21. As the follower stem is thus moved, the spring 28 acts to seat the valve 21, thereby cutting off the flow of fluid from the supply reservoir 6 to the brake pipe.

It will here be noted that when on one car the supply of fluid under pressure from the local supply reservoir 6 to the brake pipe is thus cut off, the brake pipe pressure on the following car will drop rapidly as a result of this cutting off of the additional supply of fluid to the brake pipe and the flow of fluid from this car toward the rear of the train. Thus the supply control valve device 7 on this following car will function to cut off the flow of fluid from the local supply reservoir 6 to the brake pipe. This cutting off of the supply of fluid from the reservoirs 6 will thus be serially propagated from car to car throughout the length of the train.

With the supply valve 21 on each of the cars of the train seated the pressure of fluid in the supply reservoirs will be higher than brake pipe pressure, so that upon a further increase in brake pipe pressure to effect another release graduation of the brakes the rapid increase in brake pipe pressure and the rapid propagation thereof throughout the train is insured.

It will be understood that following each operation of the brake valve device between a release position and lap position the brake controlling valve device functions in the usual well known manner to release brake cylinder pressure the amount called for by the increase in brake pipe pressure.

The volume of the supply reservoir may be such that when in graduating the release of the brakes the brake pipe pressure has been increased to within three pounds of the normal pressure carried the supply reservoir pressure will have been reduced to a pressure substantially equal to brake pipe pressure. When the brake pipe pressure has been thus increased, no further release graduations are necessary and the final release of the brakes is effected by continuing the increase in brake pipe pressure to its normal pressure. As the brake pipe pressure increases fluid under pressure on each car flows from the brake pipe to the supply reservoir by way of branch passage 8, diaphragm chamber 14, passage 27, passage 30, passage 24, past the supply valve 21, chamber 22 and pipe 23, which supply valve at this time will be subject to the opposing pressure of the spring 28 to seat the valve when the supply reservoir is charged to substantially that of the brake pipe.

From the foregoing description it will be seen that the supply control valve devices on the train will, when a graduated release of the brakes is initiated by the operation of the engineman's brake valve device in the usual manner, function to quickly propagate a rapid rate of increase in brake pipe pressure from car to car throughout the length of a train and thereby insure much quicker release graduations of the brakes than has heretofore been possible with the usual brake equipment when the supply of fluid under pressure came from the main reservoir alone.

*Description of modification shown in Fig. 2*

In Fig. 2 a modification of the invention is shown in which the only changes which have been made over the apparatus shown in Fig. 1 are in the details of construction of the supply control valve device, the control and operations of this device in charging the equipment and applying and releasing the brakes being substantially the same as the corresponding device shown in Fig. 1. In view of this it is deemed unnecessary to describe the operations of this device in detail. However since the details of construction are different the device may be briefly described as comprising a casing having a piston chamber 50 which is connected to the brake pipe branch pipe and passage 8 and which contains a piston 51 having a stem 52 adapted to operate a slide valve 53 contained in a chamber 54 which is connected to the piston chamber 50 through a flow restricting port 55 in the piston, which port corresponds with the choked passage 16 of the supply control valve device shown in Fig. 1.

Also contained in slide valve chamber 54 is a light spring 56 which corresponds with the spring 20 of the device shown in Fig. 1. This spring is interposed between and operatively engages the casing and the end of the piston stem 52 and is adapted to maintain the piston 51 and thereby the piston stem 52 and slide valve 53 in the position in which they are shown in Fig. 1 when the equipment is devoid of fluid under pressure or when the pressure of fluid in valve chamber 54 is substantially equal to brake pipe pressure in piston chamber 50 as when the equipment is fully charged with fluid under pressure and also when in graduating the release of the brakes the brake pipe pressure drops due to one source of fluid supply being cut off from the brake pipe and to the flow of brake pipe fluid toward the rear end of the train.

In initially charging and in recharging the equipment with the slide valve 54 in this position, the supply reservoir 6 is charged with fluid under pressure from the brake pipe by way of branch pipe and passage 8, a choked passage 57, past a spring weighted check valve 58 and a passage and pipe 59.

When the brake pipe pressure is increased to initiate a release graduation the piston 51 and thereby the piston stem 52 and slide valve 53 will be moved from the position in which they are shown to their innermost position in which a cavity 60 in the slide valve connects a passage 61, which is in constant open communication with the supply reservoir passage 59, to a passage 62 leading to the under side of a spring weighted check valve 63 contained in a valve chamber 64 which is connected to a short passage 65 connected to the passage 57 at a point located on the brake pipe side of the choked portion thereof. This provides a communication through which fluid flows from the supply reservoir to the brake pipe to accelerate the rate of increase in brake cylinder pressure and thereby propagate a quick release graduation of the brakes from car to car throughout the length of the train.

At a point located between the passage 65 and the communication from the pipe 8 to the piston chamber 50, the passage 57 is provided with a restriction 66 which corresponds to the restriction 31 of the apparatus shown in Fig. 1.

While two illustrative embodiments of the invention have been described in detail, it is not our intention to limit its scope to these embodiments or otherwise than by the terms of the appended claims.

Having now described our invention, what we claim as new and desire to secure by Letters Patent, is:

1. In a fluid pressure brake, a brake pipe, means operative upon the increase in brake pipe pressure in steps for graduating a release of the brakes, a reservoir normally charged with fluid under pressure and means operative upon each step of increase in brake pipe pressure to admit additional fluid under pressure to the brake pipe from said reservoir and operative upon a subsequent drop in brake pipe pressure occasioned by the equalization of the pressure throughout the brake pipe to limit the amount of additional fluid admitted to the brake pipe, and means for restricting the flow of fluid from said reservoir to the brake pipe to prevent the pressure of fluid in the reservoir from equalizing into the brake pipe upon effecting the first step of increase in brake pipe pressure and to prevent the supply of the additional fluid from materially affecting said drop in brake pipe pressure.

2. In a fluid pressure brake, a brake pipe, means operative upon the increase in brake pipe pressure in steps for graduating a release of the brakes, means operative upon each step of increase in brake pipe pressure to admit additional fluid under pressure to the brake pipe and operative upon a subsequent drop in brake pipe pressure occasioned by the equalization of the pressure throughout the brake pipe to limit the amount of additional fluid admitted to the brake pipe, and means for so restricting the flow of the additional fluid to the brake pipe that it will not prevent said drop in brake pipe pressure.

3. In a fluid pressure brake equipment of the type having a brake pipe which is normally charged with fluid under pressure and having a brake controlling valve mechanism operative upon a reduction in brake pipe pressure for effecting an application of the brakes and operative upon subsequent increases in brake pipe pressure in successive steps for graduating the release of the brakes, a local source of fluid pressure, a recharging control valve device comprising a movable abutment subject to the opposing pressures of the brake pipe and a chamber, and a valve operated by said abutment upon each step of increase in brake pipe pressure for opening a communication through which fluid under pressure is supplied from said local supply and controlled by the abutment to close said communication upon a normal subsequent drop in brake pipe pressure occasioned by the flow of fluid to charge the equipment and to the equalizing of the pressure throughout the length of the brake pipe, and means for so restricting the flow of fluid from said local source to the brake pipe that it will not affect the drop in brake pipe pressure to such an extent as to prevent the operation of said movable abutment by the pressure of fluid in said chamber.

4. In a fluid pressure brake equipment of the type having a brake pipe which is normally charged with fluid under pressure and having a brake controlling valve mechanism operative upon a reduction in brake pipe pressure for effecting an application of the brakes and operative upon subsequent increases in brake pipe pressure in successive steps for graduating the release of the brakes, a local source of fluid pressure, a recharging control valve device comprising a movable abutment subject to the opposing pressures of the brake pipe and a chamber, and a valve operated by said abutment upon each step of increase in brake pipe pressure for opening a communication through which fluid under pressure is supplied from said local supply and controlled by the abutment to close said communication upon a normal subsequent drop in brake pipe pressure occasioned by the flow of fluid to charge the equipment and to the equalizing of the pressure throughout the length of the brake pipe, means for so restricting the flow of fluid from said local source to the brake pipe that it will not affect the drop in brake pipe pressure to such an extent as to prevent the operation of said movable abutment by the pressure of fluid in said chamber, and means for retarding the rate of flow of fluid from said chamber to the brake pipe.

JOHN CANETTA.
EARLE S. COOK.